United States Patent [19]

Senda et al.

[11] 4,368,218

[45] Jan. 11, 1983

[54] METHOD OF MAKING EXPANDABLE THERMOPLASTIC POLYMER BEADS

[75] Inventors: Kenichi Senda, Akashi; Tatehiko Nishida, Himeji; Masao Nakagawa, Takasago, all of Japan

[73] Assignee: Kanegafuchi Kagaku Kogyo Kabushiki Kaisha, Osaka, Japan

[21] Appl. No.: 131,047

[22] Filed: Mar. 17, 1980

[30] Foreign Application Priority Data

Mar. 19, 1979 [JP] Japan .................................. 54-32680

[51] Int. Cl.³ .............................................. B05D 7/00
[52] U.S. Cl. ..................................... 427/222; 521/59; 521/60
[58] Field of Search ..................... 521/59, 60; 427/222

[56] References Cited

U.S. PATENT DOCUMENTS

| | | | |
|---|---|---|---|
| 3,682,844 | 8/1972 | Schoegler et al. | 521/59 |
| 3,743,611 | 7/1973 | Muroi et al. | 521/96 |
| 3,826,765 | 7/1974 | Alteres, Jr. | 521/59 |
| 3,959,189 | 5/1976 | Kitamora | 521/59 |

*Primary Examiner*—Morton Foelak
*Attorney, Agent, or Firm*—Moonray Kojima

[57] ABSTRACT

Expandable thermoplastic polymer beads and method of producing same, wherein a core of a polymer of one or more vinyl monomers is substantially surrounded by a layer of a polyolefin comprising one or more vinyl monomers, with a foaming agent contained in at least the core.

5 Claims, No Drawings

METHOD OF MAKING EXPANDABLE THERMOPLASTIC POLYMER BEADS

BACKGROUND OF THE INVENTION

This invention relates to expandable thermoplastic polymer beads and method of producing same, and more particularly to such expandable beads which substantially does not lose foaming agent absorbed therein and which substantially improved elasticity, expandability, strength and moldability.

In the prior art, there are a number of different kinds of expandable polymer beads, for example, use of a styrene based monomer added to a polyethylene-based resin in an aqueous medium, polymerizing the two together and then impregnating a foaming agent therein. These modified beads show a certain amount of improved elasticity in their molded expanded products as compared to the beads made of polystyrene alone, and show a relatively high degree of expansion as compared to beads made of polyolefines alone. Also, such modified beads readily absorb foaming agents and produce relatively good expanded pre-foams. However, disadvantageously, such prior art modified beads tend to lose their foaming agents a short time after impregnation. Thus, these modified beads, although having the properties of good degree of expansion and good elasticity, cannot be stored for any substantial length of time and thus must be used almost immediately by the user.

SUMMARY OF THE INVENTION

An object of the invention is to eliminate the foregoing and other disadvantages and deficiencies of the prior art.

Another object is to improve the retentivity of foaming agent in expandable beads, and improve the expandability, strength and elasticity and moldability of such expandable beads.

Further objects are to produce expandable thermoplastic polymer beads which are readily prefoamable by foam producers and which have good suitable elasticity, expandability, strength, and excellent moldability and which can be stored for some time prior to molding into ultimate products.

The foregoing and other objects, and advantages of the invention are attained in a composite thermoplastic polymer bead which comprises a core and substantially surrounding said core a skin, and containing a foaming agent at least in the core. The core comprises a polymer formed from one or more vinyl monomers. The skin comprises a polyolefine containing one or more vinyl monomers. The foaming agent may be gaseous or liquid at ordinary temperature and pressure and have a boiling point lower than the softening point of the core. In forming the composite beads, the skin may be polymerized onto core with cross-linking there-between using cross-linking agent. Advantageously, such composite beads exhibit the surprising properties of excellent elasticity, strength, moldability and expandability, without any substantial loss of foaming agent during storage.

A feature of the invention is an expandable polymer bead having a core comprising one or more vinyl monomers, and a skin surrounding the core comprising a polyolefine containing one or more vinyl monomers, with one or more expanding agents contained in at least the core.

Other features are the core comprising polystyrene and/or methyl methacrylate, and the skin comprising polyethylene, ethylene-vinyl acetate copolymer, ethylene-methyl methacrylate copolymer, ethylene vinyl chloride copolymer, 1,2-polybutadiene, and mixtures thereof.

Further features are the vinyl monomer used in the skin is from 5 to 50 weight percent, more preferably 10 to 30 weight percent, of the polyolefine resin used in the skin.

Other features are the weight ratio of the core to the skin being in the range of from 95:5 to 30:70.

The foregoing features, objects, advantages will become more apparent from a consideration of the following detailed description.

DETAILED DESCRIPTION OF THE PREFERRED EMBODIMENTS

The vinyl polymer used in the core of the inventive beads, are preferably polymer comprising mainly polystyrene and/or methyl methacrylate. These polymers are superior in their ability to retain foaming agents, and in their foamability. They also have the advantages of good physical properties. The vinyl polymers are preferably formed from vinyl monomers which contain 60 to 100% by weight of styrene and/or methyl methacrylate and 0 to 40% by weight of monomers other than styrene and/or methyl methacrylate. When the content of styrene and/or methyl methacrylate is less than 60% by weight, the produced polymer does not have sufficient retainability of foaming agent. Also the physical properties of the product is not as required of expandable beads.

The polyolefine used in the skin of the invention are preferably polyethylene, an ethylene-vinyl acetate copolymer, an ethylene-methyl methacrylate copolymer, an ethylene-vinyl chloride copolymer, 1,2, polybutadiene, and mixtures thereof.

The vinyl monomer contained in the polyolefine, is preferably those which can be absorbed into the polyolefine resin. Once absorbed into the polyolefine resin, the vinyl monomer functions to lower the melt viscosity of the polyolefine and to improve the strength of the skin when properly incorporated. The vinyl monomer content in the polyolefine resin is preferably within the range of 5 to 50 weight percent, and more preferably between 10 to 30 weight percent. When the vinyl monomer content is less than 5 weight percent, the effect and function thereof are less than desired. On the other hand, when the vinyl monomer content is more than 50 weight percent, the skin formed from the polyolefine onto the core, becomes hard and brittle.

The vinyl polymer formed from the monomer absorbed into the polyolefine preferably chiefly comprises polystyrene. However, a small amount of any of the following may be mixed with the polystyrene, for example, poly methyl methacrylate, poly acrylonitrile, polyvinyl acetate and the like.

It is preferable that the weight ratio of the core to the skin be within the range of from 95/5 to 30/70. When the ratio of the core to the skin exceeds 95:5, the desired effects cannot be obtained from the polyolefine skin. On the other hand, when the weight ratio is below 30:70, the foaming capacity to enable sufficient expansion becomes insufficiently low for any practical usage.

The foaming agent used in this invention does not have to dissolve the vinyl polymer in general, or at least does not have to swell it excessively. The foaming agent should be gaseous or liquid at ambient temperature and atmospheric pressure. Thus, a lower aliphatic hydrocarbon can be used for this purpose. For example, the foaming agent may be chiefly comprised of such lower alphatic hydrocarbons as propane, butane, or pentane, and the remainder of the composition may be replaced by hexane, heptane or cyclohexane.

This invention also pertains to a novel method of producing expandable thermoplastic polymer beads, and comprises suspending grains of a vinyl polymer, a powdered polyolefine, one or more vinyl monomers and a cross-linking agent in an aqueous medium containing a dispersing agent, and polymerizing the vinyl monomers in the presence of an initiator, wherein a foaming agent may be added to the dispersion mixture during or after the polymerization, or absorbed into beads of the vinyl polymer prior to starting the polymerization.

The vinyl monomers, other than the primary monomers which constitute the grains or core, preferably have good solubility for the grains or core of the primary polymer, and have poor solubility for the polyolefine. That is, when the primary vinyl monomer is styrene, methyl methacrylate, acrylonitrile, vinyl acetate can be used. If however, styrene is used alone, the polyolefine will also properly cover the polystyrene core. But by the use of vinyl monomers other than the primary vinyl monomer, e.g. styrene, the stability of the suspension mixture will be improved. Moreover, inasmuch as these vinyl monomers are well grafted onto or blended with the primary vinyl monomer, e.g. polystryrene, they can contribute to the control of the mechanical properties of the core polymer.

The grains of the core polymer used is preferably from 300 to 5000 microns in size, in the case of polystyrene. This criterion can be applied to the other polymers.

Provided the symbol "A" is the weight of the grains of vinyl polymer, the symbol "B" is the weight of powdered polyolefine, and the symbol "C" is the weight of one or more vinyl monomers, the ratio of (A+B) to C, is preferably within the range of 90:10 to 30:70. When the ratio of (A+B):C is larger than 90:10, the polyolefine coat on the vinyl polymer becomes insufficient. On the other hand, when the ratio is smaller than 30:70, the suspension of the solution becomes unstable. Moreover, the propertion of A to B must be determined in order that the ratio of the core to the skin may be within the range of 95:5 to 30:70 in weight.

By taking into consideration the partition of the vinyl monomers "C" into vinyl polymer "A" and polyolefine "B," the quantitative proportion of A to B can be decided. When the weight of vinyl monomer "C" is small, the A:B proprotion can be set to a value in the area of 95:5 to 30:70. When "C" is large, in order for the ratio of the core to the skin to take a value between 95:5 and 30:70, the A:B proportion will be determined appropriately by experimentation.

As a dispersing agent of this invention, water soluble polymers, such as polyvinyl alcohol, methyl cellulose, inorganic compounds hard to dissolve in water such as calcium phosphate, or magnesium pyrophosphate may be used. In the present process, the core of vinyl polymer should be covered by and adhered to by the skin of polyolefine. Thus, the affinity of the two polymers and their combinational effect on the melt viscosity becomes important in discussing the covering efficiency as to the beads. From this standpoint, ethylene-vinyl acetate copolymer with a vinyl acetate content of 15% to 50% by weight and melt index of 1 to 100 gives excellent results as to covering efficiency and mechanical properties as a plastic foam. In this case, the powdered ethylene-vinyl acetate copolymer is preferably from 10 to 2000 microns in size. This criterion can be applied to other polyolefines.

In the present invention, the covering efficiency can be improved when the grains of the vinyl polymer are impregnated with the foaming agent. In this case, the reaction of the dispersion mixture should be carried out under pressure using an inert gas such as nitrogen, or the foaming agent itself, as mentioned before. In order to polymerize one or more vinyl monomers added to the reaction system, conventional initiators for suspension polymerization may be used. Among these are, for example, organic peroxides, such as benzoylperoxide, lauroyl peroxide, 1, 1-bis(tert-butyl peroxy)3,3,5-trimethyl cyclohexane and the like, and azo compounds, such as azobisisobutylonitrile, azobisdimethyl valeronitrile, and the like.

Moreover, in this invention, a cross-linking agent may be employed to cross-link the vinyl polymers of the core and the polyolefine of the skin. Such cross-linking agent includes bifunctional monomers such as divinyl benzene and others, organic peroxides such as di-tert-butyl peroxide, dicumyl peroxide, and the like. The use of cross-linking agents prevents the polymer beads from shrinking during the course of pre-foaming and molding.

The expandable thermoplastic polymer beads of the present invention have a spherical or an ellipsoidal form in general. However, slight deformation of such shapes does not matter in practical usage. The beads are preferably from 400 to 8000 microns in size. Thus, any conventional molding apparatus may be used for the inventive beads without the necessity of modifying such molding apparatus.

The core of vinyl polymer serves to hold the foaming agent. For example, when the core is made of polystyrene, it retains the foaming agent as well as when polystyrene alone is used as a bead. Such affinity of the polystyrene core for the foaming agent is stronger than the prior art binary polyethylene-polystryene bead using the same foaming agent.

The inventive expandable thermoplastic polymer beads can be stored for a long period of time without any substantial loss of foaming agent. This enables the expanded bead producer to transport the present inventive beads to the foam producer without having to first pre-foam. In contrast, previous to this invention, prior art expandable bead producers had to pre-foam the beads for the conventional binary cored products, such as those using a polyethylene-polystyrene core. As a result, using the inventive beads, the transportation cost can be substantially reduced. Thus, from an industrial standpoint, this invention is highly significant.

Also, the molded products produced from the inventive expandable thermoplastic polymer beads, excel in strength and elasticity, because of the fact that every interface of the foamed beads is coated with the tenacious polyolefine layer in which no substantial cellular structure is present. In this way, the molded products have strength and elasticity resulting from the double structure by which shortcomings inherent in each polymer (when used separately) are supplemented. On the other hand, prior art molded products have properties which are between those of polyethylene and polystyrene, for example, when considered separately.

The present invention is further illustrated hereinbelow in the following specific examples, which are for illustrative purposes only, and not to be considered to be limiting in any manner.

EXAMPLE 1

An aqueous dispersion was prepared by adding 10.5 g of calcium tertiary phosphate (3.5 parts by weight) as a dispersing agent and 0.126 g of sodium alkyl olefine suphonate (0.42 part by weight) to 1500 g of pure water placed in a 3 liter autoclave. In the aqueous dispersion was suspended 300 g of powdered ethylenevinyl acetate copolymer with a melt index of 3 and 25% vinyl acetate content (100 parts by weight) (a product of Seitetsu Kagaku K.K. sold under the tradename "Flowback K-2010," particle size 149–710 microns) and 450 g of polystyrene beads (150 parts by weight) (particle size 840–1410 microns) containing 7% by weight butane as foaming agent, and the mixture was agitated with a 300 rpm stirrer. To the well dispersed suspension, there were added 150 g of methyl methacrylate (50 parts by weight) and 150 G of styrene containing 0.08 parts by weight of divinyl benzene, 0.28 weight part benzoyl peroxide, and 0.15 weight part 1,1-bis(tert-butyl peroxy)3,3,5-tri-methyl cyclohexane (50 weight parts). The polymerization was conducted as stated below. The inner pressure of the autoclave reached 9 kg/cm$^2$ by introducing N$_2$ gas at 15° C. Then, the temperature was kept at 60° C. for one hour. And then, the temperature was kept at 90° C. for 3 hours. Then, the resultant product was heated at 105° C. for 2 hours, and cooled. When the temperature fell to 40° C., N$_2$ gas was purged before 90 g of n-butane (30 weight parts) was introduced. After the reaction system was maintained at 105° C. for 6 hours, the product was cooled and taken out from the autoclave and then rinsed in water.

The obtained beads had a spherical shape containing 6.0 weight percent n-butane, and was coated uniformly with about 30 weight percent ethylene-vinyl acetate copolymer. The beads were aged at 5° C. for 24 hours before steam was applied to cause their foaming. As a result, expansion of as much as 61 times of the original volume was observed.

The beads pre-foamed by about 30 times were stuffed into a 20×25×10 cm frame and exposed for 20 seconds to the heat of the steam having a pressure of 0.8 kg/cm$^2$. The resulting molded product, in which the beads were found to be closely fused, had a density of 0.035 and showed excellent strength and elasticity, as compared with conventionally foamed polystyrene.

Separately, the beads were left standing at ambient temperature (about 15° C.) in order to investigate the retainability of foaming agents. The beads showed that the foaming agent was gone from the skin of ethylene vinyl acetate copolymer in two days, but that the core retained 82% extending from the second to the 15th day. This figure means clearly that there is substantially no reduction in retainability of foaming agent by the beads produced by the invention, as compated with conventional polystyrene beads having similar particle size. Such conventional polystyrene beads retain about 89% for similar periods.

Ten days after the absorption of foaming agent by the invention beads, the beads were expanded up to 57 times the original volume when steam was applied, and the beads were caused to be connected.

Thus, the inventive beads showed the surprising results of highly improved elasticity, expandability, strength and moldability and substantially without sacrificing the retainability of the foaming agent.

EXAMPLE 2

In 300 g of styrene (100 weight parts) were dissolved divinyl benzene, benzoyl peroxide and 1,1-bis(tert-butyl peroxy) 3,3,5-trimethyl cyclohexane, each amount of which was the same as that of methyl methacrylate used in Example 1. N-butane was used in an amount of 180 g (60 weight parts), whch was twice as much as that of Example 1. The other conditions were the same as in Example 1. The produced beads contained 6.8 weight percent n-butane and proved to have a slightly deformed spherical form. The beads were able to expand up to 57 times the original volume when heated in the same way as Example 1. Two molded products produced from the same sample of beads were caused to expand by about 30 times and about 40 times in the pre-foaming stages and had densities of 0.032 and 0.021 respectively. In these molded products each bead was found to be closely fused together. These molded products both were superior to conventional foamed polystyrene in elasticity and strength. The elasticity of these molded products were found to be better than those of the molded products of Example 1. Investigation of the retainability of the foaming agent (at 20° C.) according to the procedure described in Example 1 showed 75% for the expandable beads of this invention and 86% for the conventional expandable polystyrene beads. Ten days after the impregnation of the foaming agent into the inventive beads, the beads were expanded up to 45 times the initial volume when subjected to heat.

Thus, the invention showed surprisingly high elasticity expandability, strength and moldability without substantial sacrifice of retainability of foaming agent.

EXAMPLE 3

The production of the expandable thermoplastic polymer beads of this invention was carried out in the same way as explained in Example 1, except for acrylonitrile being used in place of the methyl methacrylate. The produced beads had a spherical shape and contained 6.3 weight percent n-butane. An amount of ethylene-vinyl acetate copolymer was found to cover the core uniformly. However, in this case, the beads looked somewhat yellowish, because acrylonitrile was used instead of methyl methacrylate. The beads expanded up to 64 times the original volume when subjected to steaming in the same was as described in Example 1. In this molded product, produced from beads caused to expand about 30 times in the pre-foaming stage, each of the beads was observed to be fused together. The density was 0.032. The strength, and the elasticity both were superior compared with conventional polystyrene beads. However, the results were less than the results of Example 1.

The retainability of the foaming agent was measured by the same method as in Example 1, and found to be 83%, whereas the retainability of conventional polystyrene beads was 89%. 10 days after impregnation of the foaming agent into the beads, the beads were expanded as much as 52 times the original volume upon heating.

Thus, although there was yellowing, and slighly less strength and elasticity as compared with Example 1, the sample still showed surprisingly high strength, elasticity, and also good expandability and moldability without any substantial sacrifice of retainability of foaming agent.

EXAMPLE 4

Instead of N₂ gas, 60 g of n-butane (20 weight parts) was introduced into the autoclave with standard pressure at ambient temperature. After standing at 60° C. for one hour, the mixture was polymerized at 90° C. for 3 hours. After polymerization, the temperature was raised to 105° C. and stirring was continued for 2 hours. The product was then cooled and taken out from the autoclave and rinsed in water. The resulting beads contained 5.1% by weight n-butane and had a spherical shape. The beads expanded up to 58 times the original volume when subjected to the same steam treatment of Example 1.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A method of producing expandable thermoplastic polymer beads, comprising the steps of suspending grains of a polymer made from one or more kinds of vinyl monomers, a powdered polyolefine resin, one or more kinds of vinyl monomers and a cross-linking agent into an aqueous medium containing a dispersing agent at a first temperature thereby to cause said vinyl monomer to impregnate said polymer and said resin and cause said resin to adhere to the surface of said grains of said polymer, and thereafter at a temperature higher than said first temperature, melting said resin onto the surface of said grain thereby forming a skin thereabout and concurrently polymerizing the resulting dispersin mixture in the presence of an initiator, thereby polymerising said monomer with said resin ins said skin, wherein a foaming agent is added to said dispersin mixture during or after polymerization, or said foaming agent is absorbed into grains of said polymer prior to start of polymerization.

2. The method of claim 1, wherein said grains of polymer are expandable polystyrene previously impregnated with said foaming agent prior to start of polymerization.

3. The method of claim 1 or 2, wherein said vinyl monomer is selected from the group consisting of styrene, methyl methacrylate, acrylonitrile and vinyl acetate.

4. The method of claim 1, 2, or 3, wherein the ratio of (A+B):C, is in the range of from 90:10 to 30:70, wherein "A" represents the weight of grains of said polymer, "B" represents the weight of said powdered polyolefine, and "C" represents the weight of one or more vinyl monomers.

5. The method of claim 1, wherein said cross-linking agent is selected from the group consisting of divinyl benzene, di-tert-butyl peroxide and dicumyl peroxide.

* * * * *